Jan. 5, 1960 M. E. SALLACH 2,920,310

COMPARISON DEVICES

Filed Jan. 28, 1957 5 Sheets-Sheet 1

INVENTOR.
MAX E. SALLACH
BY
Wallace and Cannon
Att'ys.

INVENTOR.
MAX E. SALLACH
BY
Wallace and Cannon
Att'ys.

INVENTOR.
MAX E. SALLACH
BY
Wallace and Cannon
Att'ys.

Jan. 5, 1960 M. E. SALLACH 2,920,310
COMPARISON DEVICES
Filed Jan. 28, 1957 5 Sheets-Sheet 4

| NUMBER SENSED | SWITCHES CLOSED | RELATIVE AMPERE TURNS IN COILS 70L | 70R | 71L | 71R | 72L | 72R | 73L | 73R | 74L | 74R | 75L | 75R | 76L | 76R | 77L | 77R | 78L | 78R | 79L | 79R |
|---|---|---|---|---|---|---|---|---|---|---|---|---|---|---|---|---|---|---|---|---|---|
| 0 | NONE | -2 | 0 | 0 | 0 | 0 | 0 | 0 | 0 | 0 | 0 | 0 | 0 | 0 | 0 | 0 | 0 | 0 | 0 | 0 | 0 |
| 1 | 2+9 | -2 | +2 | -1 | -1 | -2 | +2 | 0 | -1 | 0 | +2 | 0 | -1 | 0 | +2 | 0 | -1 | 0 | +2 | -2 | +2 |
| 2 | 2 | -2 | +2 | -1 | 0 | -2 | 0 | 0 | 0 | 0 | 0 | 0 | 0 | 0 | 0 | 0 | 0 | 0 | 0 | 0 | +2 |
| 3 | 4+9 | -2 | +2 | 0 | -1 | 0 | +2 | -1 | -1 | -2 | +2 | 0 | -1 | 0 | +2 | 0 | -1 | 0 | +2 | -2 | +2 |
| 4 | 4 | -2 | +2 | 0 | 0 | 0 | 0 | -1 | 0 | -2 | 0 | 0 | 0 | 0 | 0 | 0 | 0 | 0 | 0 | 0 | +2 |
| 5 | 6+9 | -2 | +2 | 0 | -1 | 0 | +2 | 0 | -1 | 0 | +2 | -1 | -1 | -2 | +2 | 0 | -1 | 0 | +2 | -2 | +2 |
| 6 | 6 | -2 | +2 | 0 | 0 | 0 | 0 | 0 | 0 | 0 | 0 | -1 | 0 | -2 | 0 | 0 | 0 | 0 | 0 | 0 | +2 |
| 7 | 8+9 | -2 | +2 | 0 | -1 | 0 | +2 | 0 | -1 | 0 | +2 | 0 | -1 | 0 | +2 | -1 | -1 | -2 | +2 | -2 | +2 |
| 8 | 8 | -2 | +2 | 0 | 0 | 0 | 0 | 0 | 0 | 0 | 0 | 0 | 0 | 0 | 0 | -1 | 0 | -2 | 0 | 0 | +2 |
| 9 | 9 | -2 | +2 | 0 | -1 | 0 | +2 | 0 | -1 | 0 | +2 | 0 | -1 | 0 | +2 | 0 | -1 | 0 | +2 | -2 | 0 |

FIG. 7

INVENTOR.
MAX E. SALLACH
BY
Wallace and Cannon
Attys.

Jan. 5, 1960 M. E. SALLACH 2,920,310

COMPARISON DEVICES

Filed Jan. 28, 1957 5 Sheets-Sheet 5

INVENTOR.
MAX E. SALLACH

BY
Wallace and Cannon
Attys.

United States Patent Office 2,920,310

Patented Jan. 5, 1960

2,920,310

COMPARISON DEVICES

Max E. Sallach, Chesterland, Ohio, assignor to Addressograph-Multigraph Corporation, Wilmington, Del., and Cleveland, Ohio, a corporation of Delaware Application January 28, 1957, Serial No. 636,569

11 Claims. (Cl. 340—149)

This invention relates to a new and improved device for comparing information encoded in one form with similar information encoded in a substantially different form. More specifically, the invention relates to a comparator for comparing a first group of business instruments bearing information in a first data code with a second group of business instruments bearing similar information encoded with a different data code.

In many different business applications, master files or records comprising extremely large total amounts of information are required. In many of these business operations, the master files comprise individual record cards or printing devices each of which may be coded with information in the form of a series of punched holes or similar indicia formed therein or applied thereto in accordance with a predetermined coding arrangement. These same master records may carry additional information in the form of printed legends. Moreover, many ordinary business instruments, such as checks and the like, which are utilized in ordinary business transactions are similarly coded with corresponding information in order to facilitate sorting and accounting procedures.

It is possible to obtain a wide variety of different accounting, printing, and other business machines all of which are responsive to punched-hole or similar indicia encoded in accordance with a single data code. There are several different coding schemes or types of codes in general use, however, with different distinctive data codes being used predominately by different manufacturers. Consequently, in some instances it may be economically desirable to utilize one particular data code for instruments of a given type and another data code for instruments of a different type, all within one general business operation. For example, it may be desirable to add check-issuing and accounting equipment to an existing address-printing system, and it may not be possible to obtain new equipment of the type desired which utilizes the information code of the already existing machines. In these instances, and in others, it is desirable to afford a simple, economical, and accurate device or apparatus for comparing information in the two different types of codes at some stages in the business operation. In this specification, and in the appended claims, reference is made to different "types" of codes to indicate differences in the schemes or plans of notation upon which the codes are based, rather than two differences in the physical elements such as marks or card apertures which are employed to represent the coded data.

It is an object of the invention, therefore, to provide a new and improved device for comparing information from two data codes of different types.

It is another object of the invention to afford a new and improved comparison device of the aforementioned type which is capable of high speed operation commensurate with the relatively high speeds required for modern business machines.

An additional object of the invention is the provision of a new and improved information-comparison device which is essentially simple and economical in construction and which includes a minimum of moving parts, thereby avoiding maintenance and accuracy problems insofar as possible.

The invention is thus directed to a comparator for comparing primary information, encoded in accordance with a first data code of a given type, with secondary information encoded in accordance with a second data code of a different type. A comparator constructed in accordance with the invention comprises a matrix including a plurality of storage elements equal in number to the product of the maximum number of bits of data to be compared and the total number of different data characters available in each of the codes. First and second sets of coupling elements are individually associated with the storage elements, each of these sets including at least one coupling element associated with each of the storage elements. Means are provided to generate electrical signals corresponding to the primary information and to apply these signals to the first set of electrical coupling elements to record the primary information in the matrix by altering the polarization of at least a selected one of the storage elements. Further means are provided to generate electrical comparison signals representative of the secondary information and to apply these comparison signals to the second set of electrical coupling elements for comparison with the information recorded in the matrix by altering the polarization state of at least a selected one of the storage devices. In addition, control means comprising a set of electrical coupling elements individually associated with the storage elements are provided to generate a control signal having a polarity indicative of coincidence between cores changed in polarization in response to the two signals applied to the matrix; accordingly, this control signal is indicative of the comparison status of the information. The storage elements should be of the type having substantially rectangular hysteresis characteristics, thus, they may comprise toroidal magnetic cores having substantially rectangular magnetic hysteresis characteristics or piezoelectric crystals or ceramics having substantially rectangular dielectric hysteresis characteristics. The coupling elements may comprise suitable windings or coils for magnetic cores or suitable electrodes for dielectric cores.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 7 is a tabular representation of certain operating effects in the matrix of Fig. 4;

Figure 1:
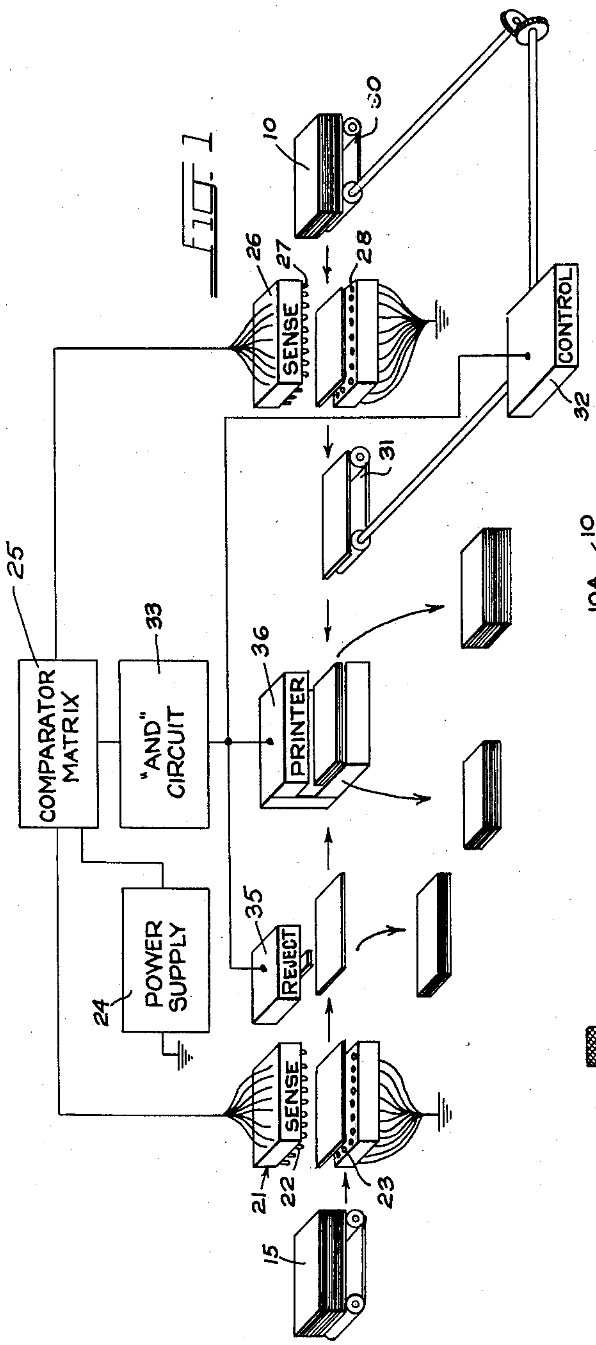
Fig. 1 is a schematic representation of a buisness machine including a comparator constructed in accordance with the invention and is provided to afford a background permitting complete understanding of the inventive concept.
Figure 2:
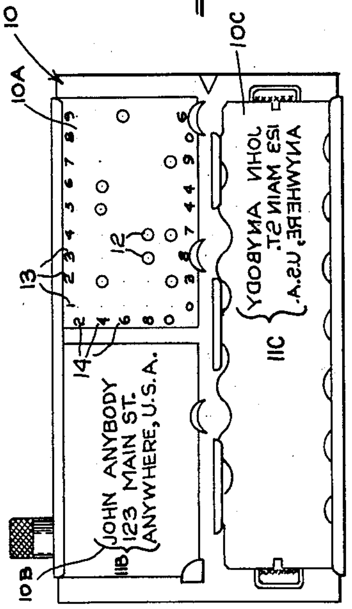
Fig. 2 shows a typical record instrument bearing information in accordance with one currently used data code.

The apparatus illustrated in Fig. 1 comprises one example of a business-machine application for a comparison device constructed in accordance with the invention. The illustrated apparatus is intended for use in an application in which a plurality of master record cards or printing devices are already in existence and in use for one particular phase of the overall business operation; for example, the printing devices may have been available for some time for use in a printing machine employed to address envelopes to a relatively large list of clients or customers. One of the printing devices 10 is illustrated in Fig. 2. The printing device, which comprises a printing plate of the type described in detail in U.S. Patent No. 2,132,412, includes a record card 10A and an identification card 10B both formed from relatively stiff paper stock. Identification card 10B is imprinted with certain information, in this instance comprising the name and address of a particular customer or client as indicated at 11B. In addition, printing device 10 includes further information in the form of a series of punched holes 12 formed in record card 10A. As indicated in Fig. 2, the punched holes are arranged in a series of columns 13 and in a further series of rows 14. The punched holes are formed in accordance with a predetermined data code and, in the particular example shown, are utilized to convey numerical formation such as the serial number of a bank account or other similar data. In the particular code shown, the data number for a given column is indicated by the presence of none, one, or two apertures in that column. Thus, the number zero is indicated by leaving the card unpunched for a given column, the number one is indicated by apertures in rows two and nine, the number two by an aperture in row two, the number three by apertures four and nine, and so on. It will be recongnized by those skilled in the art that this particular data code is one frequently employed in addressing machines; it should be understood, of course, that other coding arrangements may be employed. Printing device 10 also includes an embossed plate 10C which may be utilized in printing the name and address of the customer, the embossed portion being indicated at 11C.

Figure 3:
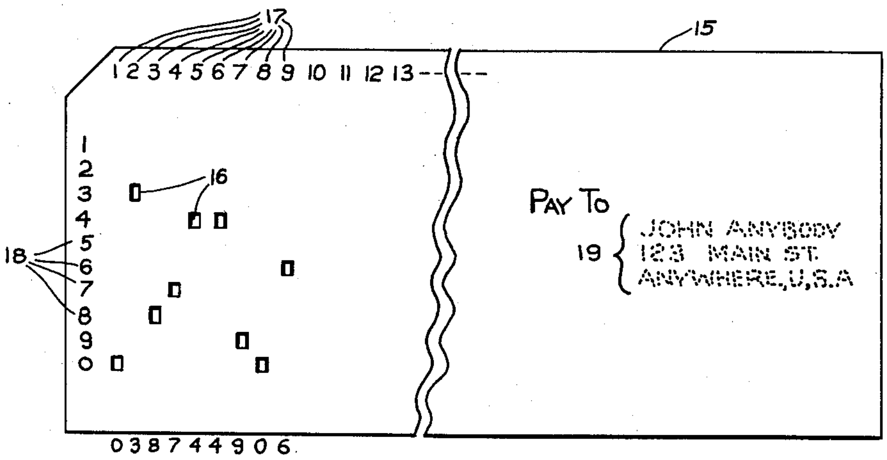
Fig. 3 shows a different business instrument carrying information in a different data code.

The system illustrated in Fig. 1 is adapted to work also with a second set of business instruments bearing punched-hole information. The business instruments 15, one of which is illustrated in Fig. 3, may, for example, comprise checks, statements, or other similar accounting instruments. In the particular instrument 15 shown in Fig. 3, information corresponding to that conveyed by the punched holes 12 in master record card 10A (Fig. 2) is afforded by means of a series of punched holes or similar indicia 16 arranged on the card in a series of columns 17 and a series of rows 18. Punched holes 16, however, are formed in accordance with a completely different data code than punched holes 12. Thus, the numerical value for each of columns 17 is indicated by a single one of the apertures 16 aligned with a particular one of the rows 18. In the particular system shown in Fig. 1, it is desired to imprint each of the business instruments 15 with the information 11C from one of the master record cards 10 if and only if the code information represented by the apertures 16 in the business intrument corresponds exactly with the information denoted by the apertures 12 in the corresponding master record card 10A. Thus, the instrument 15 is to be imprinted with the information as indicated at 19 in the drawing if the two serial numbers encoded in the business instrument and record card are identical.

The business machine illustrated in Fig. 1 comprises a first sensing station or device 21 which is utilized to analyze the individual business instruments 15 and to generate electrical signals representative of the information denoted by the apertures 16. The sensing device 21 may be of completely conventional construction and may include a multiplicity of electrically conductive sensing elements or pins 22 arranged in a pattern corresponding to the row and column pattern of the business instrument code. The conductive pins 22 are arranged to make contact with a corresponding plurality of socket members 23 whenever the individual pins are able to pass through one of the apertures in a particular business instrument 15 being sensed. Accordingly, as will be explained more completely hereinafter, the sensing device 21, in conjunction with a power supply 24, is able to generate the electrical signals necessary for one phase of the operation of a comparator matrix 25, which is connected to both the power supply and the sensing device.

The system of Fig. 1 further includes a second sensing device 26 which is in most respects essentially similar to sensing device 21 and which may include a plurality of electrical sensing elements or pins 27 arranged in a pattern corresponding to the data code pattern of rows 14 and columns 13 on the record cards 10A. Sensing pins 27 are arranged to complete an electrical connection to a corresponding plurality of socket members 28 whenever they are permitted to pass through one of the apertures 12 in a particular record card 10A during operation of the machine. Sensing device 21 is connected to the comparator matrix 25 in a manner to be explained more completely hereinafter. It will be understood that the sensing devices 21 and 26 are not restricted to mechanical pin-type arrangements, as described, but may comprise photoelectric scanning devices or other similar apparatus capable of sensing the code data on the record instruments 10 and 15.

The apparatus of Fig. 1 further includes a printing device transport schematically illustrated as a pair of conveyors 30 and 31, the operation of the conveyors being controlled by an electrically actuated control mechanism 32. It will be understood that the card transport would also include means for feeding the plates 10 one by one to the sensing station 26 and for subsequently continuing the movement of the plates after they have been analyzed in the sensing station. The transport control mechanism 32 is controlled from an "and" circuit 33 which is electrically coupled to the comparator matrix 25. Circuit 33 is also coupled to a reject mechanism 35 located closely adjacent the sensing station 21. The system also includes a printing mechanism 36 for imprinting the business instruments 15 with the information 11C from devices 10; alternatively, in some systems, a facsimile printing system may be employed for this portion of the printing machine. Printer 36 is coupled to the "and" circuit 33.

As indicated above, the system illustrated in Fig. 1 is adapted to compare individual ones of the master record devices 10 with the corresponding business instruments 15 and to imprint the business instruments with the printed matter 11C carried by the record instruments 10 whenever coincidence in the punched-hole serial number information on the two instruments is found. Accordingly, when the system is placed in operation, one of the checks or other business instruments 15 is fed to the sensing station 21 and transport 30 is actuated to feed one of the printing devices 10 to the other sensing station 26. The two sensing stations are then actuated to apply electrical signals to the comparator matrix 25, these signals being representative of the punched-hole information carried by the two instruments. The comparator matrix is utilized to compare the information on the two instruments, column by column, and to apply electrical signals to the "and" circuit 33; circuit 33 distinguishes between signals representative of information coincidence and non-coincidence. If the information on the two devices is identical, circuit 33 develops an output signal which is applied to control mechanism 32 to permit continued operation of the printing device, transport 30, 31. The same control signal is applied to reject mechanism 35 to prevent operation of that device and to printer 36 to control the operation of that unit. Consequently, movement of the two instruments is continued so that printing device 10 traverses and the corresponding business instrument 15 are both forwarded to the printing station 36. The embossed information 11C on the record instrument 10 is utilized in station 36 for reproduction of the customer's address or like data on the business instrument 15. Printing apparatus suitable for this application is very well known in the art and need not be described in detail here. It will of course be understood that any other suitable printing facsimile or other reproduction devices may be substituted for the printer 36 if desired.

In the illustrated system, not all of the business instruments 15 are to be completed and mailed out; some are to be eliminated from the mailing operation. For example, the record devices 10 may already have been sorted to determine just which business instruments should be sent out at a particular time. Consequently, in operation of the system shown in Fig. 1 there will be instances in which one of the instruments 15 being sensed in station 21 does not correspond in serial number to the printing device 10 currently being sensed in station 26. Whenever this condition is encountered, the comparator matrix 25 generates an output signal substantially different from that developed in the case of coincidence between the two serial numbers. Accordingly, the "and" circuit 33 does not generate the same output signal as it would in instances of information correspondence and does not permit continued operation of the printing device transport control mechanism 32. At the same time, the output from circuit 33 is such that the reject mechanism 35 is actuated to remove the business instrument 15 from the system before it can reach printing station 36. The printing device transport 30, 31 remains inactivated until a business instrument 15 having a serial number corresponding to that of the device 10 currently positioned in sensing station 26 is advanced into sensing station 21. When this occurs, the system recognizes the coincidence of serial number information and continues operation as described above.

Figure 4:
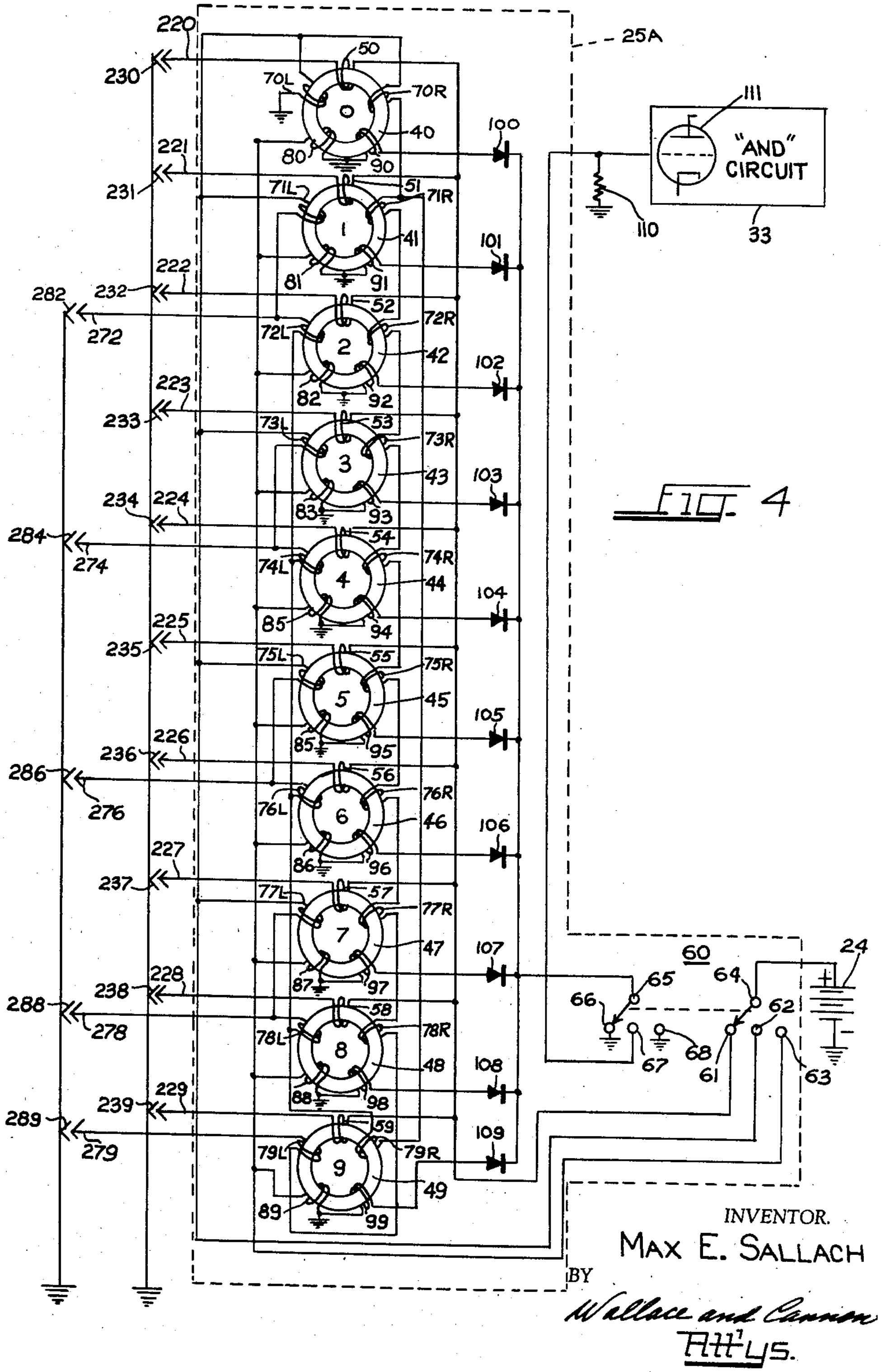
Fig. 4 is a circuit diagram of one section of an electrical matrix which forms one embodiment of a basic part of the inventive comparator device.

The basic circuitry for one embodiment of the comparator matrix 25 is illustrated in Fig. 4, which shows that portion of the comparator matrix utilized for comparing one column or significant item of information from each of the two record instruments. As indicated in Fig. 4, the one-column comparator stage 25A includes a plurality of storage elements, comprising the toroidal magnetic cores 40—49, which are equal in number to the maximum number of different effective data characters available in each of the two codes employed for instruments 10 and 15. In this instance, since serial numbers are being compared, and since the maximum number of effective characters is equal to the total of ten different rows 18 in the code applied to instruments 15, the cores in a given comparator stage total ten in number. Preferably, the comparator includes as many stages similar to stage 25A as there are columns on the two record cards, so that the entire matrix 25 would include cores equal in number to the product of the maximum number of bits of data on any one of the instruments to be compared and the total number of different effective data characters available in either of the codes.

The individual sensing pins or other corresponding sensing elements 22 of the sensing station 21 are shown in Fig. 4 as contact elements 220—229. The sensing pins 220—229 are aligned with a corresponding series of the socket contact elements 23, individually designated in Fig. 4 by the reference numerals 230—239. All of the socket elements 230—239 are electrically interconnected and, in the illustrated circuit, are grounded. The sensing pins or similar elements 27 of sensing station 26, on the other hand, are shown as contact elements 272, 274, 276, 278, and 279 which correspond to the designations for rows 14 in the code utilized for the punched-hole information in the devices 10. The corresponding electrical contact elements, sockets 28 of sensing station 26, are designated in Fig. 4 by the numerals 282, 284, 286, 288, and 289. The socket contact elements 282, 284, 286, 288, and 289 are electrically interconnected with each other and, in the illustrated embodiment, are grounded. It is thus seen that the basic electrical elements of the two sensing stations are schematically shown in Fig. 4.

The sensing pins 220—229 are individually connected to a first series of electrical coupling elements, comprising the windings 50—59, associated with cores 40—49 respectively. That is, sensing pin 220 is connected to one terminal of a coil 50 wound upon core 40, pin 221 is connected to one terminal of a coil 51 wound upon core 41, pin 222 is connected to one terminal of a coil 52 wound upon core 42, and so on. The terminals of the coils 50—59 opposite the sensing pins 220—229 are all electrically interconnected with each other and are connected to one terminal 61 of a comparator switch 60.

A second series of electrical coupling elements is sensing pins 272, 274, 276, 278, and 279 of the master record card sensing station; the second series of electrical windings is not as simple and straightforward, however, as the first set 50—59. Rather, the number of coils and the electrical connections for the second set of windings are determined by the requirements of the more complex data code utilized in connection with the master record plates. Thus, one winding 70L in the second series is associated with core 40; one terminal of coil 70L is grounded and the other terminal of the coil is connected to a second terminal 62 on switch 60. Switch terminal 62 is also connected to one terminal of each of a further plurality of coils 71L, 73L, 75L, and 77L individually associated with the toroidal cores 41, 43, 45, and 47 respectively. The other terminals of each of the coils 71L, 73L, 75L and 77L are electrically connected to the sensing pins 272, 274, 276, and 278 respectively. The individual sensing pins 272, 274, 276, and 278, on the other hand, are also individually electrically connected to one terminal of each of a further series of electrical windings 72L, 74L, 76L, and 78L respectively, the remaining terminals of these coils being electrically connected to each other and to one terminal of a coil 79R associated with core 49. As indicated in the drawing, coils 72L, 74L, 76L, and 78L are individually associated with cores 42, 44, 46, and 48 respectively. The remaining terminal of coil 79R is electrically connected to one terminal of a coil 70R associated with core 40, the remaining terminal of coil 70R being connected back to switch terminal 62.

The common electrical junction between coils 70R and 79R is also connected to one terminal of a coil 71R wound upon core 41. Coil 71R is the first in a group of series-connected coils 71R—78R which are individually associated with cores 41—48 respectively. The remaining terminal of the last coil in the series, winding 78R, is connected to sensing pin 279 through a winding 79L associated with the toroidal core 49. It will thus be seen that the second set of electrical windings in the comparator stage 25A includes coils 70L—79L and coils 70R—79R, two coils per core, connected in a relatively complex manner between switch terminal 61 and the sensing pins 272, 274, 276, 278, and 279, with one terminal of the one coil 70L being grounded.

The matrix stage 25 further includes a series of electrical coupling elements, windings 80—89, individually associated with cores 40—49 respectively and connected in parallel with each other between ground and a switch terminal 63. Windings 80—89 comprise the reset windings of the illustrated comparator stage, as will be explained more completely hereinafter. In addition, the comparator matrix stage 25A includes a series of read-out windings 90—99 individually associated with cores 40—49 respectively and connected in parallel with each other between ground and a terminal 65 of the master switch 60. A series of diodes 100—109 are individually connected in series with the coils 90—99 respectively to avoid undue loading of the core matrix in operation and to afford a relatively high impedance to negative-going electrical signals and a low impedance to positive polarity signals.

The control switch 60 of matrix stage 25A is a double pole triple-throw device including an input terminal 64 which may be electrically connected to any of the three terminals 61—63, depending upon the position to which the switch is thrown. Terminal 64 is also connected to one terminal of the power supply 24, which may comprise any suitable source of D.C. energy and which is represented in Fig. 4 as a battery. The other or output terminal 65 of switch 60 is connected, as indicated above, to the output coils 90—99 of the matrix stage. Terminal 65 may be connected to any of three terminals 66, 67, and 68, depending on the position of the switch. As indicated in the drawing, the two individual sections of switch 60 are ganged so that when terminal 65 is connected to terminal 66 terminal 64 is connected to terminal 61, when terminal 65 is connected to terminal 67 terminal 64 is connected to terminal 62, and when terminal 65 is connected to terminal 68, terminal 64 is connected to terminal 63. Switch terminals 66 and 68 are grounded, but terminal 67 is connected to the input stage of the "and" circuit 33 as indicated schematically by the input resistor 110 and the vacuum tube amplifier 111. In this connection, it should be noted that circuit 33 may comprise any of a number of logical "and" circuits known in the art, particularly in the computer field, and is not especially critical insofar as operation of the invention is concerned. Circuit 33 may constitute any of the known circuits capable of correlating pulse inputs from a series of sources such as the individual stages of the comparator matrix 25 to develop a particular output signal only when a given type of pulse is received from all of the input stages. In the illustrated embodiment, by way of example, the output signal from the comparator stage 25A representative of the desired coincidence condition comprises a positive-polarity pulse and each of the stages 111 of the circuit 33 is actuated for conduction only by a pulse of this polarity. Accordingly, it will be seen that the "and" circuit may comprise a conventional ring counter, a series of multi-vibrators, or any of a number of other circuits of this general type.

In order fully to understand operation of the comparator matrix as represented by the single stage 25A thereof shown in Fig. 4, it is desirable to consider the magnetic properties of the individual toroidal cores 40—49. Each of these magnetic cores is preferably fabricated from material having a substantially rectangular hysteresis characteristic of the general type illustrated in Fig. 5. In this figure, the flux density B in one of the magnetic cores is recorded as a function of magnetomotive force H applied to the core. The magnetic cores exhibit two stable states of magnetization 120 and 121 which are of opposite polarity. Assuming that the core is in the positive stable condition indicated by point 120, application of a magnetomotive force in one direction, indicated as a +H force, cannot change the stable condition of the core; as soon as the current producing the M.M.F. is cut off, the core returns approximately to the same point of stability 120. Application of a negative-going magnetomotive force of subsequent magnitude, however, drives the core along the portion of the magnetization curve indicated by reference numeral 122 and, when this M.M.F. is cut off, the core goes to the second stable condition 121. Similarly, if the core is in state 121, application of a negative-going M.M.F. thereto does not change the magnetization state appreciably, whereas a positive M.M.F., if of sufficient magnitude, may induce a change to the first stable condition 120. This phenomenon is well known in the art, and has been utilized in numerous applications, particularly in the field of computer devices and in other apparatus requiring the storage of information.

With the system of Fig. 1 in operation as described hereinabove, a given one of the business instruments 15 is positioned in sensing station 21 and the sensing station is actuated to impell the sensing pins 22 toward the socket members 23. For any given column in the business instrument card 15, there is only one aperture; consequently, for the particular coding arrangement used for the business instruments used in this example, only one of the contact pairs 220, 230 and the like can be closed. Accordingly, with the card in the sensing station, only one of these contact pairs is closed and movement of switch 60 to its first position, as shown in Fig. 4, causes the sensing station to complete a circuit between power supply 24 and ground through only one of the first series of windings 50—59. If it is assumed that all of the cores are established in the negative stable condition 121 before the sensing operation is initiated, and that the current through the coil is in a direction to produce a positive magnetomotive force in its particular core, that one and only that one of the cores is changed in its magnetization state by virtue of the sensing operation. In effect then, the coded information from one column of the business instrument 15 is stored in the matrix stage 25A. At the same time, of course, the information from the remaining columns is stored in other similar stages of the comparator matrix 25. It should be noted that for this first operational step, the output terminal 65 of the matrix stage is grounded and consequenly no output signal is applied to circuit 33.

As the next operational step for the comparison device, switch 60 is moved to its second position with terminals 62 and 64 interconnected and with terminals 65 and 67 interconnected. In this position, power supply 24 is connected to the second set of electrical windings including coils 70L—79L and 70R—79R and to the sensing pins of sensing station 26. Actuation of the switch in this manner may produce one of two effects. If any of the cores are driven from the negative stable point 121 to the positive condition of magnetization, a negative pulse is developed in the output circuit comprising switch terminals 65 and 67 and the input resistor 110 of circuit 33. These negative-going pulses, however, do not affect the conduction state of the amplifier stage 111 of "and" circuit 33 and do not indicate a condition of coincidence in the compared information. On the other hand, if any of the cores are driven from the positive stable point 120 to a condition of negative magnetization, a positive-polarity electrical output pulse is developed in the output circuit and is applied to tube 111 to render that tube conductive and thereby indicate an identity of information between the two bits of information from the two code columns being compared. This polarity distinction between data conditions is inherent in the wiring and connection system for matrix stage 25A, as will be explained more completely hereinafter in connection with Figs. 6 and 7.

In the final operational step for the matrix stage, switch 60 is thrown to its third operating position with terminal 64 connected to terminal 63 and with output terminal 65 grounded through terminal 68. With the switch in this position, each of the coils 80—89 is energized, the direction of current flow through the coils being such that a negative-going magnetomotive force is developed in each of the cores 40—49. Consequently, by moving switch 60 to its third or reset position, the entire core array in the matrix stage 25A is driven to the negative point of stability 121 to reset the matrix stage for a subsequent sensing and comparing operation.

Figures 6, 9:
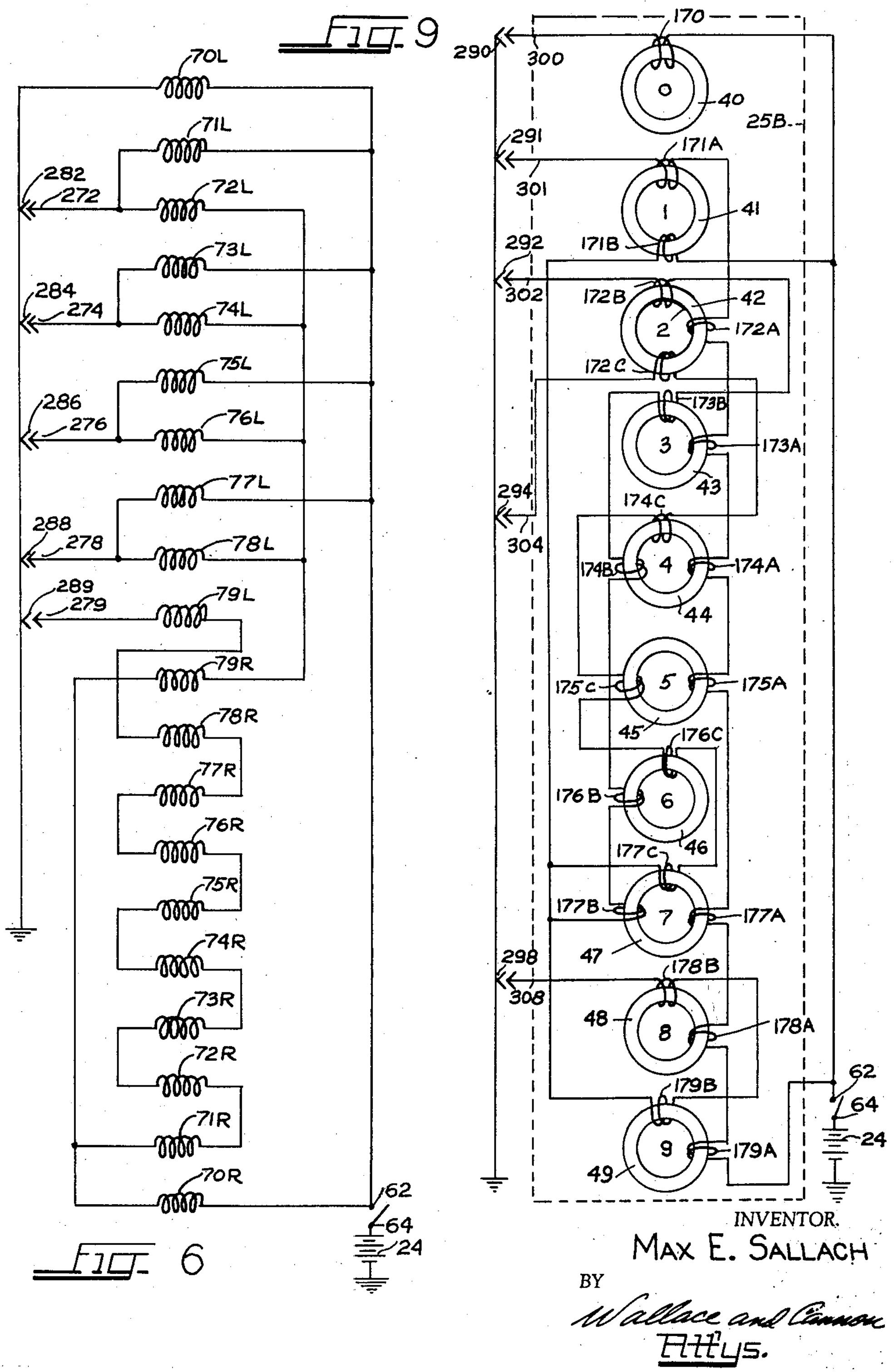
Fig. 6 is a simplified wiring diagram for a part of the matrix of Fig. 4.
Fig. 9 is a circuit diagram of a matrix section representative of another embodiment of the invention.

Fig. 6 affords a simplified wiring diagram for the second or "70" winding series and affords a convenient means for understanding the operation of this portion of the comparator matrix. Fig. 7, on the other hand, affords a tabular representation of the relative ampere turns in the different "70" series coils for different code conditions; in the present instance these different code conditions comprise the different possible numbers recorded in a given column in accordance with the data code described in connection with Fig. 2.

Figure 5:
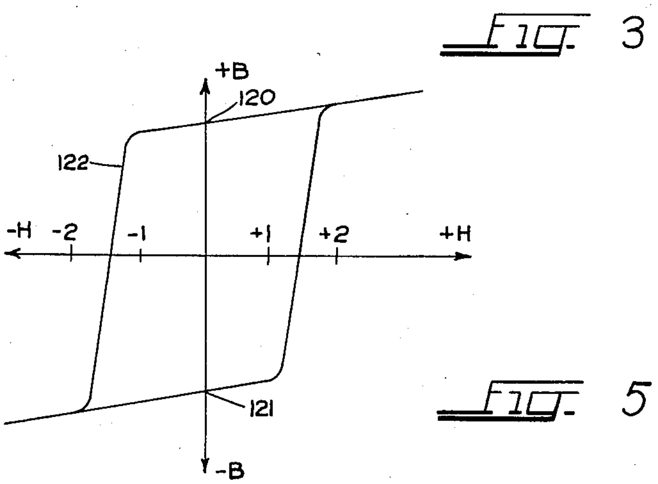
Fig. 5 is an explanatory diagram employed to explain certain characteristics of the magnetic core components of the matrix of Fig. 4.

After the first sensing operation, in which the data from business instrument 15 is recorded in matrix stage 25A, it may be assumed that, for example, only core 40 has been driven to the positive magnetization stability point 120. Under these circumstances, the matrix stage is conditioned to represent the number zero; stated differently, the number zero is stored in stage 25A. As indicated in Fig. 5, the M.M.F. required to change the magnetization state of the core may be designated as having an amplitude of 2 units; the actual physical value will depend upon the core material, and the current required will also be determined by the number of turns in winding 40. Subsequently, when switch 60 is thrown to its second or comparison position, a number of different conditions may obtain. Thus, if the master record column being compared with the business instrument column is coded to represent the number zero, none of the sensing contacts shown in Fig. 6, will be closed, since there will be no aperture in the master record card. This being the case, only coil 70L is energized from power source 24. This coil is wound in a direction and with an impedance such that it develops a magnetomotive force approximately equal to and opposite in polarity to that developed in the initial recording action and drives core 40 back to a negative magnetization state. This action induces a positive-polarity electrical pulse in the output coil 90 associated with core 40 and this pulse is applied to circuit 33 to render tube 111 conductive. Consequently, a condition of information coincidence is indicated to the "and" circuit. Since no other magnetic cores are energized at this time, no other impulses can be applied to the circuit 33 for this set of conditions.

It may well be, however, that the two devices being compared do not coincide. If this is the case, at least one of the contact pairs of the second sensing station 26 will be closed during the second sensing or comparison operation. For example, with the number zero stored in matrix stage 25A from the first sensing operation, the number two may appear as the information from the second or master record instrument. Under these circumstances, contact pair 272, 282 closes. Since coil 70L is still connected in electrical circuit with power source 24, a relative M.M.F. of −2 will again be developed in core 40. At the same time, however, an electrical circuit is now established from power source 24 through coils 70R, 79R, and 72L, and back to the power source by means of the ground connections. The winding directions and relative impedances of these coils are made such that the current through coil 70R simultaneously induces in core 40 an M.M.F. of +2, opposite in polarity and approximately equal in magnitude to that afforded by the current through core 70L. As a consequence core 40 is not changed in magnetization state and no electrical impulse of appreciable magnitude is applied to the output circuit of the matrix stage from read-out winding 90. At the same time, of course, the current through coils 79R and 72L produces some magnetomotive force in cores 49 and 42 respectively. Coil 49R, however, is wound in a direction and with an impedance such that the M.M.F. developed in core 49 by current through this coil is positive-going and therefore develops only a negative impulse in the output circuit. Coil 72L, on the other hand, is constructed to afford a negative-going magnetomotive force under the conditions set forth but does not materially effect the output circuit because it tends to drive the core along that portion of its negative characteristic having a negligible slope. Inasmuch as the core is already negatively polarized no substantial electrical signal is developed in the output circuit.

Figure 8:
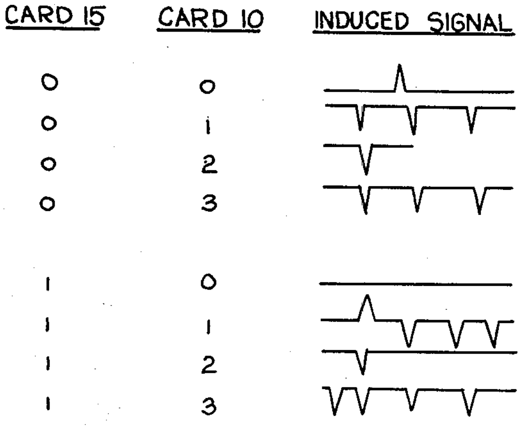
Fig. 8 is a diagrammatic representation of certain illustrative signal conditions in the matrix of Fig. 4.

The net overall magnetomotive force applied to each of the coils of the "70" series of windings is shown in Fig. 7, the particular conditions which produce positive polarity pulses in the output circuits and therefore indicate information coincidence being shaded to show the manner of operation of the matrix stage. It will be seen from this chart that a negative M.M.F. of −2 in the relative ampere-turn units of the chart is necessary to produce the positive-polarity output signal indicative of information coincidence; it must of course be remembered that this signal is generated only when the negative M.M.F. is applied to a core already established in the positive stable condition by the previous recording of information from one of the business cards 15. To further illustrate this operational characteristic of the comparator matrix, reference may be made to Fig. 8, which shows the output signal developed for certain representative sample switching conditions. An exhaustive analysis of these signals showing all possible switch combinations may be made to prove that a positive electrical signal is developed only for information coincidence conditions, but it is not considered that such a detailed examination of all potential conditions need be included here.

In order to afford a complete picture of the winding and impedance values which should obtain in the critical second series of coils in the matrix stage 25A, the following relative values for these coils are given, based upon an arbitrary assumption that approximately two ampere turns are required to effect a change in magnetization state of one of the cores and that the power supply effectively generates approximately 2/27 or approximated 0.075 volt. (A power supply affording a substantially greater output voltage, such as 100 v., dropped through suitable resistors, is usually preferable in a commercial device.)

| Coil | Impedance (Ohms) | Turns | Relative Ampere Turns |
|---|---|---|---|
| 70L | 27 | 1 | −2 |
| 71L | 54 | 1 | −1 |
| 72L | 9 | 1 | −2 |
| 73L | 54 | 1 | −1 |
| 74L | 9 | 1 | −2 |
| 75L | 54 | 1 | −1 |
| 76L | 9 | 1 | −2 |
| 77L | 54 | 1 | −1 |
| 78L | 9 | 1 | −2 |
| 79L | 2 | 2 | −2 |
| 70R | 9 | 1 | +2 |
| 71R | 2 | 1 | −1 |
| 72R | 2 | 2 | +2 |
| 73R | 2 | 1 | −1 |
| 74R | 2 | 2 | +2 |
| 75R | 2 | 1 | −1 |
| 76R | 2 | 2 | +2 |
| 77R | 2 | 1 | −1 |
| 78R | 2 | 2 | +2 |
| 79R | 9 | 1 | +2 |

As indicated above, it is desirable to afford as many individual comparator matrix stages 25A as there are columns of coded information to be compared in the system. All of the individual operating switches 60 of the stages may of course be ganged together to permit simultaneous recording of the initial code information, subsequent comparison thereof with the information from a second instrument to obtain an output signal, and finally, resetting of the entire comparator matrix. It will also be recognized that the functions of the reset windings 80—89 may be combined with those of the output windings 90—99, and even with those of the input windings 50—59, since each of these winding series comprises one coil per core and they are employed sequentially rather than simultaneously. This combination of functions in a single series of windings is of course advantageous from the standpoint of reducing winding complexity, but introduces disadvantages with respect to the switching arrangements which must be afforded in the matrix. Accordingly, the choice of combination or separation of the functions afforded by these particular coils in the matrix will depend primarily upon the economic factors involved and the preferences of the designer. Moreover, it is not practical to combine the read-in windings 50—59 with other sets of coils except in the particular instance of a decimal code such as that employed in business instruments 15; any binary or modified binary code of the type employed for the master records 10 obviates the possibility of this particular functional combination.

Fig. 9 illustrates a matrix stage, comparable to stage 25A of Fig. 4, for use with a different data code. In this figure, only the secondary group of electrical coupling elements or windings is illustrated, the illustrated embodiment being adapted to compare information encoded in accordance with the decimal code described in connection with Fig. 3 with information encoded in accordance with a type of data code which is different from both of the previously described codes. Thus, the embodiment of Fig. 9 is intended for operation with business instruments or other devices in which numerical information is encoded by five different basic notations or aperture positions, but the significance of the five basic notations is substantially different from the five information positions available in the code applied to master record devices 10, Fig. 2. In the data code with which the embodiment of Fig. 9 is intended to be employed, the five operational notations are designated as zero, one, two, four, and eight. In a punched card, individual numerals would be encoded by apertures positioned with a given column as follows:

| Number: | Aperture positions |
|---|---|
| 0 | 0 |
| 1 | 1 |
| 2 | 2 |
| 3 | 1+2 |
| 4 | 4 |
| 5 | 1+4 |
| 6 | 2+4 |
| 7 | 1+2+4 |
| 8 | 8 |
| 9 | 1+8 |

It will be seen that this code is substantially different from either of those previously described; like the decimal code applied to instruments 15, at least one aperture is provided for each data character, in this instance for each numeral, but as many as three different notational apertures may be utilized to indicate a single numerical value. The data code will be recognized by those skilled in the art as one which has been applied in certain so-called "increased capacity" record card systems. In the simplified diagram of Fig. 9, only the second set of electrical windings is shown in conjunction with the magnetic cores 40—49, since the initial group of read-in windings 50—59, the reset windings 80—89, and the read-out windings 90—99 may be formed in the same manner as illustrated in Fig. 4.

The matrix stage 25B shown in Fig. 9 includes a first electrical coupling element or winding 170 associated with core 40 and adapted to be connected in circuit with the power source 24 through terminals 62 and 64 of the master switch 60 (see Fig. 4) and through a pair of contact members 290 and 300 which may form a part of a conventional card-sensing device. Contact element 290 is one of five socket contact elements which correspond to the numbers zero, one, two, four, and eight, the remaining socket contact members being designated by reference numerals 291, 292, 294, and 298. All of these socket contact elements are interconnected with each other and are grounded. The corresponding pins or mating contact elements are designated by reference numerals 301, 302, 304, and 308 respectively.

The contact pair 291, 301 is connected to a series string of electrical coupling elements comprising coils 171A, 172A, 173A, 174A, 175A, 177A, 178A, and 179A, the other terminal of coil 179A being connected to switch terminal 62. These particular windings are individually associated iwth toroidal cores 41, 42, 43, 44, 45, 47, 48, and 49 respectively. Contact pair 292, 302, on the other hand, is connected in series with a plurality of coils 172B, 173B, 174B, 176B, 177B, and 171B associated with magnetic cores 42, 43, 44, 46, 47, and 41 respectively, the remaining terminal of coil 171B being connected to switch terminal 62. The next contact pair 294, 304 is connected in series with a plurality of coils 172C, 174C, 175C, 176C, and 177C individually wound upon coils 42, 44, 45, 46, and 47 respectively, the remaining terminal of coil 177C being connected back to the power supply through coil 171B. The final contact pair 298, 308 is connected in series with a coil 178B on core 48 and a coil 179B on core 49, the remaining terminal of winding 179B being returned to the power supply through winding 171B.

A brief examination of the operational characteristics of the circuit illustrated in Fig. 9 will serve to indicate that it performs essentially the same functions as the winding arrangement illustrated in Figs. 4 and 6 for coils of the "70" series except that the embodiment of Fig. 9 is adapted to a different data code. Thus, closing of the contact pair 290, 300 affects only core 40 and affords an output signal in the output windings only if that core has been changed in magnetization status by previous storage of the number zero therein according to the decimal code described hereinabove. The closing of contact pair 291, 301, on the other hand, must be arranged to affect each of cores 41—45 and 47—49, since the particular data code under consideration utilizes the "one" position as a part of the code for each of the numbers one, three, five, seven and nine and since the "one" notational position is employed in conjunction with each of the "two," "four," and "eight" positions. Similarly, closing of contact pair 292, 302 must affect cores 41, 42, 43, 44, 46, and 47, closing of contact pair 284, 294 influences cores 41, 42, 44, 45, 46, and 47, and the closing of contacts 298, 308 affects each of the cores 41, 42, and 49 to some extent. Following the convention utilized above in ascertaining the magnetomotive force to be applied through each of the coils of "170" series, the following values in relative ampere turns are desirable for accurate operation of the comparator matrix stage.

| Coils: | Relative aperture turns |
|---|---|
| 177 | −2/3 |
| 170 | −2 |
| 171A | −2 |
| 172A | +2 |
| 173A | −1 |
| 174A | +2 |
| 175A | −1 |
| 177A | −2/3 |
| 178A | +2 |
| 179A | −1 |
| 171B | +2 |
| 172B | −2 |
| 173B | −1 |
| 174B | +2 |
| 176B | −1 |
| 177B | −2/3 |
| 172C | +2 |
| 174C | −2 |
| 175C | −1 |
| 176C | −1 |
| 177C | −2/3 |
| 177B | −2 |
| 179B | −1 |

The output signals from matrix stage 25B are of essentially the same character as in the previously described stage 25A; that is, a positive-polarity output signal is developed only in the event of coincidence between decimal-code information stored in the matrix and the other data code information applied thereto through the "170" winding series.

Although the inventive concept has been described and explained in connection with toroidal magnetic cores and suitable electrical windings associated with those cores, it should be understood that it may be carried out to substantially equal advantage if capacitors fabricated from ferro-electric materials are utilized in the storage elements 40—49 instead of ferromagnetic materials. For satisfactory operation, however, it should be noted that the materials selected for the storage elements should exhibit a substantially rectangular hysteresis characteristic, regardless of whether ferromagnetic or ferroelectric phenomena are relied upon for the storage operation. In the event that a ferroelectric material is employed for the storage elements, it will of course be recognized that the individual read-in, read-out, and reset windings described hereinabove should be replaced by suitable electrodes or electrode pairs associated with cores of the particular dielectric employed.

Comparison devices constructed in accordance with the inventive concept are highly advantageous in that they permit comparison of information encoded in accordance with different data codes without entailing any requirement for a multiplicity of switching devices for translation purposes. The storage elements, whether magnetic cores or ferroelectric capacitors, are not subject to mechanical fatigue and may be expected to last almost indefinitely so that maintenance cost in the system is effectively limited to the relatively small number of moving parts entailed in the master switches 60. The invention permits utilization of business instruments or other data records coded in accordance with the different types of data codes in a single unified accounting or other similar operation and consequently permits ready utilization of an existing data storage system in conjunction with different data storage equipment without requiring substantial modification of or replacement of the existing system and records.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A comparator for comparing primary information encoded in accordance with a first data code of a given type with secondary information encoded in accordance with a second data code of a different type from said first data code, said comparator comprising: a matrix including a plurality of storage elements, each having a substantially rectangular hysteresis characteristic, equal in number to the product of the maximum number of bits of data to be compared and the total number of different effective data characters available in one of said codes, a first set of electrical coupling elements individually coupled with said storage elements and including at least one coupling element per storage element; a second set of electrical coupling elements, individually coupled with said storage elements, including at least one coupling element per storage element, said second set of coupling elements including at least two coupling elements associated with at least one selected one of said storage elements, and circuit means permanently interconnecting predetermined ones of said second set of electrical coupling elements in a sequence representative of said second data code; means for generating electrical signals representative of said primary information and for applying said signals to said first set of coupling elements to record said information in said matrix by altering the polarization of at least a selected one of said storage elements; means for generating electrical comparison signals representative of said secondary information and for applying said comparison signals to said second set of coupling elements for comparison with the primary information recorded in said matrix by altering the polarization of at least a selected one of said storage elements; and control means, comprising a set of electrical coupling elements individually coupled with said storage elements and including at least one coupling element per storage element, for generating a control signal having a polarity indicative of coincidence between storage elements changed in polarization status in response to the two aforesaid electrical signals and indicative of the comparison status of said primary and secondary information.

2. A comparator for comparing primary information encoded in accordance with a first data code of one type with secondary information encoded in accordance with a second data code of a different type from said first data code, said comparator comprising: a matrix including a plurality of storage elements, each having a substantially rectangular hysteresis characteristic, equal in number to the product of the maximum number of bits of data to be compared and the total number of different effective data characters available in one of said codes, a first set of electrical coupling elements individually associated with said storage elements and including at least one coupling element per storage element; a second set of electrical coupling elements, individually coupled with said storage elements, including at least one coupling element per storage element, said second set of coupling elements including at least one additional coupling element coupled with each of a plurality of said storage elements, and circuit means permanently interconnecting predetermined ones of said second set of electrical coupling elements in a plurality of sequences representative of said second data code; means for generating electrical signals representative of said primary information and for applying said signals to said first set of coupling elements to record said information in said matrix by altering the polarization of at least a selected one of said storage elements; means for generating electrical comparison signals representative of said secondary information and for applying said comparison signals to said second set of coupling elements for comparison with the primary information recorded in said matrix by altering the polarization of at least a selected one of said storage elements; and control means, comprising a set of electrical coupling elements individually coupled with said storage elements and including at least one coupling element per storage element, for generating a control signal having a polarity indicative of coincidence between storage elements changed in polarization status in response to the two aforesaid electrical signals and indicative of the comparison status of said primary and secondary information.

3. A comparator for comparing primary information encoded in accordance with a first data code of one type with secondary information encoded in accordance with a second data code of a different type from said first data code in which at least some data characters are determined by combinations of more than one data notation, said comparator comprising: a matrix including a plurality of storage elements, each having a substantially rectangular hysteresis characteristic, equal in number to the product of the maximum number of bits of data to be compared and the total number of different effective data characters available in each of said codes, a first set of electrical coupling elements individually coupled with said storage elements and including at least one coupling element per storage element; a second set of electrical coupling elements, individually coupled with said storage elements, including at least one coupling element per storage element and at least two additional couplings per significant data notation combination, and circuit means interconnecting predetermined ones of said second set of electrical coupling elements in a plurality of sequences representative of said second data code; means for generating electrical signals representative of said primary information and for applying said signals to said first set of coupling elements to record said information in said matrix by altering the polarization of at least a selected one of said storage elements; means for generating electrical comparison signals representative of said secondary information and for applying said comparison signals to said second set of coupling elements for comparison with the primary information recorded in said matrix by altering the polarization of at least a selected one of said storage elements; and control means, comprising a set of electrical coupling elements individually coupled with said storage elements and including at least one coupling element per storage element, for generating a control signal having a polarity indicative of coincidence between storage elements changed in polarization status in response to the two aforesaid electrical signals and indicative of the comparison status of said primary and secondary information.

4. A comparator for comparing primary information encoded in accordance with a decimal data code of one type with secondary information encoded in accordance with a second data code of a different type from said first data code and in which at least some data characters are determined by combinations of more than one data notation, said comparator comprising: a matrix including a plurality of storage elements, each having a substantially rectangular hysteresis characteristic, equal in number to ten times the maximum number of bits of data to be compared; a first set of electrical coupling elements individually coupled with said storage elements and including an equal number of coupling elements per storage element; a second set of electrical coupling elements, individually coupled with said storage elements, including at least one coupling element per storage element and at least two additional coupling elements per significant data notation combination, and circuit means interconnecting predetermined ones of said second set of electrical coupling elements in a plurality of sequences representative of said second data code; means for generating electrical signals representative of said primary information and for applying said signals to said first set of coupling elements to record said information in said matrix by altering the polarization of a selected one of said storage elements; means for generating electrical comparison signals representative of said secondary information and for applying said comparison signals to said second set of coupling elements for comparison with the primary information recorded in said matrix by altering the polarization of at least a selected one of said storage elements; and control means, comprising a set of electrical coupling elements individually coupled with said storage elements and including at least one coupling element per storage element, for generating a control signal having a polarity indicative of coincidence between storage elements changed in polarization status in response to the two aforesaid electrical signals and indicative of the comparison status of said primary and secondary information.

5. A comparator for comparing primary information encoded on a first business instrument in accordance with a first data code of one type with secondary information encoded on a second business instrument in accordance with a second data code of a different type from said first data code, said comparator comprising: a matrix including a plurality of storage cores, each having a substantially rectangular hysteresis characteristic, equal in number to the maximum number of bits of data to be compared and the total number of different effective data characters available in each of said codes, a first set of electrical coupling elements, individually coupled with said cores, including at least one coupling element per core, a second set of electrical coupling elements, individually coupled with said cores, including at least one coupling element per core, said second set of coupling elements including at least two coupling elements associated with selected ones of said cores, and circuit means interconnecting predetermined ones of said second set of electrical coupling elements in a sequence representative of said second data code; sensing means for generating electrical signals representative of said primary information and for applying said signals to said first set of coupling elements to record said information in said matrix by altering the polarization of at least a selected one of said cores; means for generating electrical comparison signals representative of said secondary information and for applying said comparison signals to said second set of coupling elements for comparison with the primary information recorded in said matrix by altering the polarization of at least a selected one of said cores; and control means, comprising a set of electrical coupling elements individually coupled with said cores and including at least one coupling element per core, for generating a control signal having a polarity indicative of coincidence between cores changed in polarization in response to the two aforesaid electrical signals and of the comparison status of said primary and secondary information.

6. A comparator for comparing primary information encoded in accordance with a decimal code with secondary information encoded in accordance with a given nondecimal data code, said comparator comprising: a matrix including a plurality of magnetic cores effectively arranged in columns equal in number to the maximum number of bits of data to be compared, each column including cores equal in number to the total number of different effective data characters available in each of said codes, a first set of electrical windings, individually linked with said magnetic cores, including at least one winding per core, a second set of electrical windings, individually linked with said magnetic cores, including at least one winding per core, said second set of windings including two windings associated with at least selected ones of said cores, and circuit means interconnecting preselected ones of said second set of electrical windings in a sequence representative of said second data code; means for generating electrical signals representative of said primary information and for applying said signals to said first set of windings to record said information in said matrix by altering the magnetization state of a selected one of said cores in each of said columns; means for generating electrical comparison signals representative of said secondary informaton and for applying said comparison signals to said second set of windings for comparison with the primary information recorded in said matrix by altering the magnetization state of at least a selected one of said cores; and control means, comprising a set of electrical windings individually linked with said magnetic cores and including at least one winding per core, for generating a control signal having a polarity indicative of coincidence between cores changed in magnetization status in response to the two aforesaid electrical signals and indicative of the comparison status of said primary and secondary information.

7. A comparator for comparing primary information encoded in accordance with a first data code of one type with secondary information encoded in accordance with a second data code of a different type from said first data code, said comparator comprising: a matrix including a plurality of magnetic cores, equal in number to the maximum number of bits of data to be compared and the total number of different effective data characters available in each of said codes, a first set of electrical windings, individually linked with said magnetic cores, including at least one winding per core, a second set of electrical windings, individually linked with said magnetic cores, including at least one winding per core, said second set of windings including at least two windings associated with selected ones of said cores, and circuit means interconnecting preselected ones of said second set of electrical windings in a sequence representative of said second data code; means for generating electrical signals representative of said primary information and for applying said signals to said first set of windings to record said information in said matrix by altering the magnetization state of at least a selected one of said cores; means for generating electrical comparison signals representative of said secondary information and for applying said comparison signals to said second set of windings for comparison with the primary information recorded in said matrix by altering the magnetization state of at least a selected one of said cores; control means, comprising a set of electrical windings individually linked with said magnetic cores and including at least one winding per core, for generating a control signal having a polarity indicative of coincidence between cores changed in magnetization status in response to the two aforesaid electrical signals and indicative of the comparison status of said primary and secondary information; and reset means, comprising a set of electrical windings individually linked with said magnetic cores, for establishing all of said cores in a given magnetization state as an incident to each comparison operation.

8. A comparator for comparing primary information encoded in accordance with a first data code of one type with secondary information encoded in accordance with a second data code of a different type from said first data code, said comparator comprising: a matrix including a plurality of magnetic cores, equal in number to the product of the maximum number of bits of data to be compared and the total number of different effective data characters available in each of said codes, a first set of electrical windings, individually coupled with said magnetic cores, including at least one winding per core, a second set of electrical windings, individually coupled with said magnetic cores, including at least two windings associated with each of said cores, and circuit means interconnecting predetermined ones of said second set of electrical windings in a preselected sequence representative of said second data code; means for generating electrical signals representative of said primary information and for applying said signals to said first set of windings to record said information in said matrix by altering the magnetization state of at least a selected one of said cores; means for generating electrical comparison signals representative of said secondary information and for applying said comparison signals to said second set of windings for comparison with the primary information recorded in said matrix by altering the magnetization state of at least a selected one of said cores; and control means, comprising a set of electrical windings individually coupled with said magnetic cores and including at least one winding per core, for generating a control signal having a polarity indicative of coincidence between cores changed in magnetization status in response to the two aforesaid electrical signals and indicative of the comparison status of said primary and secondary information.

9. A comparator for comparing primary information in a first data code of one type with secondary information in a second data code of a different type from said first data code, said comparator comprising; a matrix including a plurality of storage elements each having a substantially rectangular hysteresis characteristic equal in number to the product of the maximum number of bits of data to be compared and the total number of different effective data characters available in one of said codes; means for recording said primary information in said matrix in accordance with said first data code; control means comprising a set of electrical coupling elements individually coupled with said storage elements and including at least one coupling element per storage element; and means for applying said secondary information to said matrix, without translation to said first data code, to develop in said control means a control signal having a polarity indicative of the comparison status of said primary and secondary information.

10. A comparator for comparing primary information in a decimal code of one type with secondary information in a second data code of a different type from said first data code, said comparator comprising; a matrix including a plurality of storage elements each having a substantially rectangular hysteresis characteristic arranged in a plurality of stages equal in number to the maximum number of bits of data to be compared, each stage including ten storage elements; means for recording said primary information in said matrix in accordance with said decimal code; control means comprising a set of electrical coupling elements individually coupled with said storage elements and including at least one coupling element per storage element; and means for applying said secondary information to said matrix, without translation to said first data code, to develop in said control means a control signal having a polarity indicative of the comparison status of said primary and secondary information, said means comprising a set of electrical coupling elements individually coupled with said storage elements with plural ones of said coupling elements associated with selected ones of said storage elements.

11. A comparator for comparing primary information in a first data code of one type with secondary information in a second data code of a different type from said first data code, said comparator comprising; a matrix including a plurality of magnetic cores equal in number to the product of the maximum number of bits of data to be compared and the total number of different effective data characters available in one of said codes; means for recording said primary information in said matrix by altering the magnetic state of said cores in one-for-one correspondence with said first data code; control means comprising a set of electrical coupling elements individually coupled with said cores and including an equal number of coupling elements per core; and means for applying said secondary information to said matrix, without translation to said first data code, to develop in said control means a control signal including pulse components having a polarity indicative of the comparison status of said primary and secondary information, only pulses of one selected polarity indicating correspondence between the two sets of information.

References Cited in the file of this patent

UNITED STATES PATENTS

| | | |
|---|---|---|
| 2,702,380 | Brustman | Feb. 15, 1955 |
| 2,731,621 | Sontheimer | Jan. 17, 1956 |
| 2,734,184 | Rajchman | Feb. 7, 1956 |
| 2,774,429 | Rabenda | Dec. 18, 1956 |
| 2,776,419 | Rajchman | Jan. 11, 1957 |
| 2,784,390 | LiChien | Mar. 5, 1957 |
| 2,785,388 | McWhirter et al. | Mar. 12, 1957 |
| 2,802,203 | Stewart-Williams | Aug. 6, 1957 |